April 10, 1962  R. D. SCHULTHEISS  3,029,174
METHOD AND APPARATUS FOR PRODUCING
EXTRUDED THERMOPLASTIC NET
Filed May 20, 1959  2 Sheets-Sheet 1

INVENTOR.
RALPH D. SCHULTHEISS
BY Ramon A. Klitzke
ATTORNEY

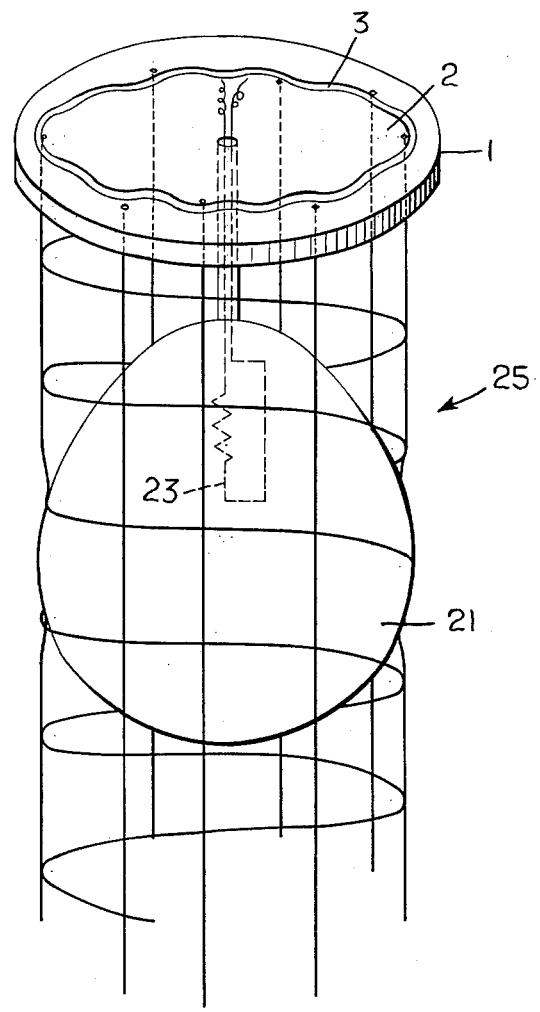

United States Patent Office 3,029,174
Patented Apr. 10, 1962

3,029,174
METHOD AND APPARATUS FOR PRODUCING EXTRUDED THERMOPLASTIC NET
Ralph D. Schultheiss, Springdale, Conn., assignor to Union Carbide Corporation, a corporation of New York
Filed May 20, 1959, Ser. No. 814,458
10 Claims. (Cl. 156—167)

This invention relates to a method and apparatus for producing extruded plastic net. More particularly, this invention relates to a method and apparatus for producing an extruded net comprised of polymeric fibers heat bonded to each other.

It is known to extrude polymeric materials in the shape of a fiber or a cylindrical tube out of a metal die. Straight thermoplastic sheets have also been extruded and various other cross-sectional shapes can be produced. It is also known to extrude plastic materials out of dies and then work the materials by stretching, stamping, cutting or spinning so as to produce various shapes and forms of varying strength and usefulness. Attempts to produce an extruded shape having open spaces therein effected during the extrusion without the need for any auxiliary working or processing have, however, not proved satisfactory. More specifically, an efficient means of producing a plastic net of crossing, joined fibers in one extrusion step, as is accomplished by the present invention, has never been devised.

It is an object of this invention to provide a method for producing a net of polymeric fibers by extruding said fibers without the need of additional processing steps.

It is also an object of this invention to provide a method for producing a net of polymeric fibers bonded together near the point of extrusion.

A further object of the invention is to provide an apparatus for producing a polymeric net.

Another object of this invention is to provide an apparatus for bonding extruded polymeric fibers together near the point of extrusion.

Other objects and advantages of the invention will become apparent from the following description and appended claims.

According to the present invention thermoplastic fibers are extruded parallel from extrusion nozzles arranged in a circle while one or more additional fibers are extruded from a nozzle moved so that the first mentioned fibers are bonded together in the form of a net by means of the fibers being extruded from the moving nozzle or nozzles.

In the preferred embodiment of the invention fibers are melt extruded from apertures arranged in a circle in an inner die and other fibers are extruded from other apertures arranged in the same circle but in an outer die.

The fibers from each die are withdrawn and held parallel as extrusion continues while at least one extrusion nozzle is passed between the apertures so as to pass on alternate sides of adjacent fibers. At some convenient point near the face of the dies, the extruded fibers from the dies are firmly contacted with the extruded fibers from the nozzle while the fibers are still in the thermoplastic state and substantially at the extruding temperature, thereby bonding the fibers at the points of contact. Upon such bonding, a strong, attractive plastic cylindrical net is produced having parallel fibers attached to each other by an interwoven fiber at some angle with the parallel fibers, depending on the speeds of rotation of the nozzle and the rate of extrusion.

A fixed former having a diameter at least as large as but not substantially larger than the diameter of the circle of die apertures may be located at a distance from the face of the rotating extrusion dies over which the cylindrical net may be passed to prevent collapse thereof and to more firmly press the inner net fibers against the outer. This former should be located as close to the die faces as possible so as to contact the crossed fibers before they are unduly cooled. The temperature of the former should be controlled so the fibers do not adhere thereto as they pass over it. If the temperature of the former is about 50° C. less than the temperature of extrusion, good results will be achieved.

It is preferable to extrude the fibers in a downward direction so that gravity will assist them over the former without unnecessary strain. It is also preferable to have driven rollers press the net against the former to help it pass thereover and to more firmly secure the joints between intersecting fibers. It is preferable to squeeze the fiber joints together so that the thickness of said joints is less than the combined diameters of the two intersecting fibers. Depending upon the resin used, the rollers should not be spaced closer to the former than the thickness of the under fiber so that undue spreading of the joint is avoided. The temperature of these rolls should be controlled so the fibers will not adhere thereto. The rolls press the fibers together so as to bond intersecting fibers together or more firmly bond fibers already bonded. The former could be heated for this purpose or both the rollers and former could be heated.

An alternative method of bonding the fibers together as they are crossed comprises a ring attached to the extrusion apparatus at a fixed distance therefrom. The two sets of fibers to be bonded together are passed over the outside of the ring and are pressed together by such action as the outer diameter of the ring is at least as large as the diameter of the outer circle of apertures.

The invention will now be explained in greater detail by reference to the drawings in which:

FIG. 4 is an isometric view of the net leaving the bottom of the apparatus and passing over a mandrel.

Figure 1:
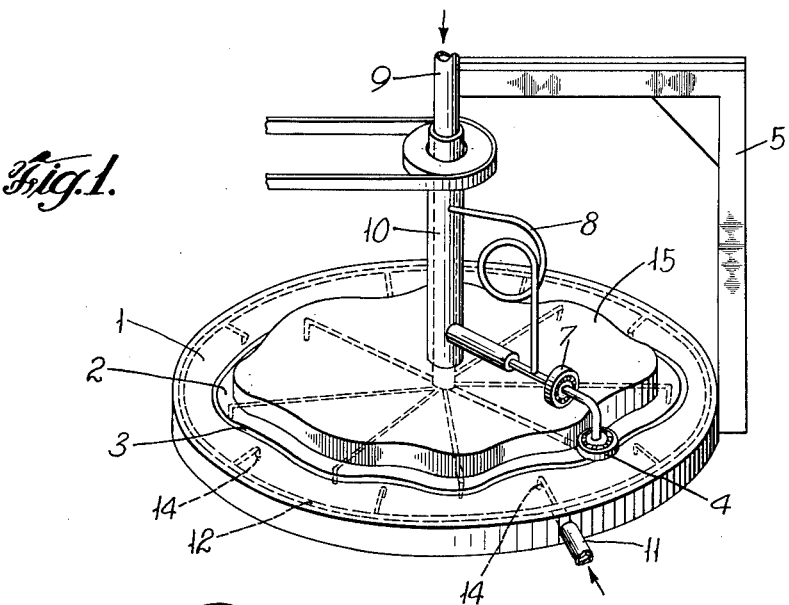
FIG. 1 is an isometric view of an apparatus for practicing the invention.
Figure 2:
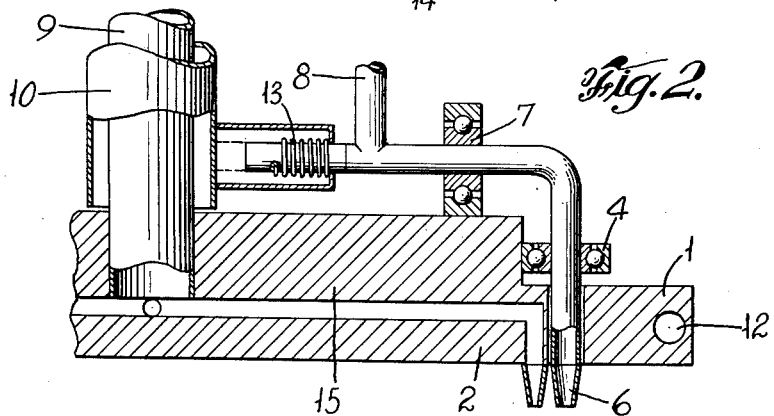
FIG. 2 is a cross-section, elevational view of a portion of the apparatus of FIG. 1.
Figure 3:
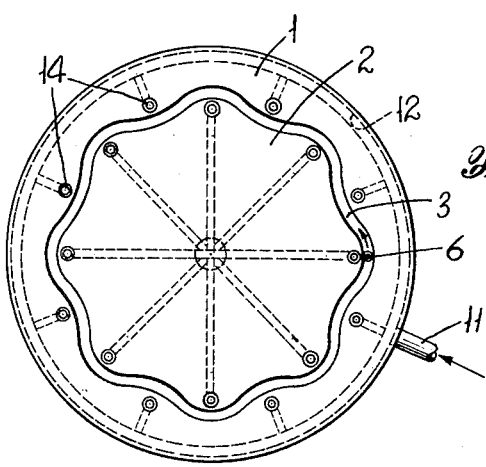
FIG. 3 is a plan view of the bottom of the apparatus.

Referring now to FIGS. 1, 2 and 3, the preferred apparatus is comprised of an extrusion plate 1 having extrusion holes 14 disposed therein in a circle. Extrusion holes 14 are supplied with thermoplastic material by means of a manifold 12 arranged at the periphery of extrusion plate 1. Said manifold 12 is supplied with thermoplastic material through inlet 11. A second extrusion plate 2 is disposed inside of extrusion plate 1 and has extrusion holes therein equally spaced. Extrusion plate 1 is constructed in the form of an annulus having a rectangular cross-section and an inner diameter of varying radius. Extrusion plate 2 has a substantially circular shape but the outer edge of extrusion plate 2 is of a varying distance from the center of the plate so as to correspond in plan shape with the inner edge of the annular extrusion plate 1. A small space or slot 3 is maintained between the two extrusion plates for the passage of moving extrusion nozzle 6. Plastic is supplied to the extrusion holes of the plate 2 through tube 9.

The shape of the slot 3 between the two extrusion plates is such that the nozzle 6 moving therein passes on alternate sides of adjacent extrusion holes. Nozzle 6, however, always passes inside the extrusion holes in plate 1 and outside the extrusion holes of inner plate 2. Extrusion plates 1 and 2 are supported by some convenient structure 5 so that the slot 3, which has little clearance on either side of nozzle 6, is maintained at a constant width.

Disposed above the inner extrusion plate 2 and adjacent thereto, is a circular cam 15 having an outer edge corresponding in shape to the shape of slot 3, said edge being located a fixed distance from slot 3. Moving nozzle 6 is thus required to follow the path of slot 3 by following the cam 15 with roller 4. Roller 7 supports nozzle 6 in a vertical direction. Spring 13 maintains roller 4 in contact with the cam.

Moving extrusion nozzle 6 is supplied with thermoplastic material through pipe 9 and flexible pipe 8. Since nozzle 6 extrudes a fiber which passes around the circumference of the circle formed by holes 14, as well as in axial direction with the other fibers, the rate of extrusion from nozzle 6 is greater than that from the extrusion holes 14. Since both the moving nozzle 6 and some of the extrusion holes 14 are supplied from pipe 9, the resistance of the feeding means to nozzle 6 and the resistance of the feeding means to holes 14 must be different. These resistances can be controlled by any convenient means, such as an orifice or restriction in pipe 9 below the entrance to pipe 8. Such resistance varying means are well known in the art, and will depend on the circumference of the circle formed by holes 14 and the desired net pattern. Motive power, not shown, is used to drive shaft 10 and thereby rotate nozzle 6 in the circle of extrusion holes.

It is obvious that additional moving extrusion nozzles such as nozzle 6 can be attached to rotating shaft 10 to provide additional interconnecting fibers. Also, the moving nozzles can be rotated with varying speeds to provide a great variety of net designs.

By adding additional inlet tubes to manifold 12, the net can be composed of fibers of various colors. If it is desired to extrude a different colored fiber from pipe 8, of course, a separate source of material would have to be provided for that pipe. Furthermore, thermoplastic materials of various colors may be supplied to different nozzles moving within slot 3.

In the operation of the apparatus disclosed herein, it is obvious that the fiber extruded from moving nozzle 6 contacts fibers extruded from the fixed holes in the extrusion plates. This contact should be made at a point where the temperature of these fibers is such that they will adhere to each other when contacted. A strong attractive plastic net is produced in the shape of a cylinder having fibers running parallel to the axis of the cylinder bonded together by diagonal fibers passing on alternate sides of adjacent parallel fibers. The fibers can be circular, elliptical or rectangular in cross-sectional shape and may be any diameter up to about one-quarter inch in diameter.

As shown in FIG. 4, a mandrel 21 can be used at a location in proximity to the point of extrusion to force the extruded fibers to contact each other or to make such contact firmer. Furthermore, the completed net 25 may be heated and stretched so as to orient the fibers thereof and may be cut and shaped into a great variety of designs and sizes; the temperature of mandrel 21 is controlled by means of electrical resistor 23.

To orient the fibers of the net, it may be passed into a heated bath in which it may be stretched so as to increase its strength and change its shape. A mandrel may be located in this bath over which the cylindrical, bonded net is passed and this mandrel can be some diameter greater than the extruded net depending upon the amount of stretching desired. The net may then be withdrawn from the mandrel at a greater rate than it initially contacts it so as to stretch it longitudinally while being stretched axially by the action of the mandrel. The bath liquid performs two functions. It provides heat for maintaining the polymeric material at its optimum orienting temperature and it provides lubrication between the mandrel and the net so the net may pass smoothly thereover.

In the case of some polymers, such as polyethylene terephthalate or poly m-xylylene adipamide, oriented polymeric net obtainable from the above orientation step is shrinkable at relatively low temperatures. If it is desired to crystallize or heat stabilize the net, i.e., render it substantially non-shrinkable up to temperatures of about 120° C., the oriented net can be held at its diameter by passing it over a second mandrel having a diameter about equal to the diameter of the oriented net to prevent shrinkage while simultaneously heating it to a temperature in excess of the second order transition temperature of the polymeric fibers but below the melting point thereof. This temperature is preferably that at which the crystallization rate is maximum.

For use in this invention, representative heats of extrusion, orientation and heat stabilization for various fibers are given in Table 1 below. It is emphasized that these temperatures are mere approximations and in no way limit the scope of this invention.

Table 1

| Material | Extrusion Temp., °C. | Orientation Temp., °C. | Heat Stabilization Temp., °C. |
|---|---|---|---|
| polyethylene | 180–250 | 18–108 | 100 |
| polyethylene DYNK [1] | 180–190 | 24 | |
| high density polyethylene | 200–250 | 95–100 | 100 |
| polystyrene | 240–280 (nominal 275° C.) | 135 | 90 |
| vinyl chloride and its copolymers | 150–170 (nominal 160° C.) | 100 | 100 |
| polypropylene | 200–250 | 115–135 | 100 |

[1] Polyethylene DYNK is produced by Union Carbide Plastics Company under high pressure and at an elevated temperature in the presence of a free-radical oxygen catalyst. It has a melt index as determined by the method described in ASTM D1238-52T of about 0.3 dgm./min. and a density of about 0.920 gram per cubic centimeter.

The heat stabilization step should always be at a lower temperature than the orientation temperature.

For good orientation, low density polyethylene can be stretched to about 500% to 550% of its original size while high density polyethylene can be stretched to about 1000% of its original size. In general, the greater the amount of stretching, the greater will be the strength obtained.

For the preparation of oriented and crystallized net from a thermoplastic polymer, it is preferred to further treat the polymer fibers after they have been bonded together. The extruded fibers when initially extruded and suddenly cooled, are in the amorphous state. Amorphous fibers are brittle and have low tensile strength. No appreciable crystallinity can be observed by means of X-ray diffraction analysis or by density measurements. The fibers cannot be readily drawn at room temperature and have very little shrinkage when relaxed and subjected to high temperatures.

The amorphous fibers can be converted to tough, highly shrinkable fibers by heating and biaxially stretching and orienting in the temperature range above the second-order transition temperature but below the temperature at which the polymer will tend to thin out without appreciable molecular orientation, i.e., at temperatures near the melting point of the resin. By second-order transition temperature is meant that temperature at which a discontinuity is noted in the first derivative of a primary thermodynamic quantity with respect to temperature, and is unaccompanied by the usual latent heat which appears in first-order transition temperatures. It is related to polymer fluidity and yield temperature. Some of the thermodynamic properties that can be observed in determining the second-order transition point are: specific volume, specific heat, density, index of refraction and modulus of elasticity.

Since each polymer composition and rate of heating may affect the observed second-order transition temperature, the optimum orientation temperature and heating rate can be readily determined by simple empirical tests.

It is preferred to pass the net downwardly during the orientation stage to allow for uniform heating and stretching, although other directional movement such as downward, horizontal or angularly disposed will also produce the desired result. It is to be understood, of course, that the orientation of the net may be done in a separate step which can be combined with the step of extruding the net over the former.

Oriented polyethylene net, obtained by the process herein described and subsequently oriented at temperatures about its second-order transition temperature, is clear, transparent, tough and shrinkable. It is also heat sealable. Biaxially oriented poly m-xylylene adipamide net can also be oriented above its second-order transition temperature of about 68° C. to produce clear, tough net.

The oriented, shrinkable nets are admirably suited for use wherein a skin tight fit around an irregularly shaped object is desired. The item to be packaged can be inserted into a loose fitting bag made of the oriented net and then the net can be heated above the second-order transition temperature to cause the net to shrink to conform to the contents of the packages.

Polyethylene net that has been extruded and biaxially stretched and oriented according to this invention will shrink almost instantly upon immersion in hot water at temperatures above 125° F.

Where it is desired to provide net dimensionally stable to high temperatures, polyethylene net can be heated to temperatures above its second-order transition temperature but below the temperature at which the fiber begins to lose molecular orientation and is crystallized under tension. This process will now be described in detail.

When molten polyethylene extruded in the form of fibers is rapidly cooled to room temperature, amorphous fibers are obtained which show very little tendency to crystallize over long periods of time. The amorphous net when heated to about its second-order transition temperature readily softens and changes from an inelastic substance to a rubbery, easily deformable and drawable material. In this drawable state, the polyethylene fibers may be easily stretched by the application of relatively small forces to yield highly oriented fibers. Even at its second-order transition temperature, the polyethylene crystallizes slowly.

Crystallization is readily initiated in oriented polyethylene fibers as they are exposed to higher temperatures. The rate of crystallization increases as the temperature rises to about 180° F. At temperatures above about 180° F. the rate of crystallization will tend to decrease. Also, at higher temperatures, viz. near the melting point, the net begins to lose some of the molecular orientation which had been imparted at the lower temperatures.

As has already been described, the oriented net is heat stabilized by heating in a bath while passing it over a mandrel, except that the net is not stretched but is merely maintained at its diameter. Heat is applied to the net only while it is being held at its diameter by the mandrel, as it would shrink if heated while not passing thereover.

The crystallized, biaxially oriented net is clear, tough, transparent, and dimensionally heat stable to temperatures up to its melting point, depending upon degree of crystallization obtained.

The process herein described can be used to control the degree of shrinkage of the polyethylene net. The time and temperature to which the biaxial oriented net is subjected during the stabilization stage will determine the degree of shrinkage.

While this embodiment of the invention has been described with particular reference to polyethylene, it is to be understood that the invention is not restricted thereto, but may be practiced with other extrudable polymers as well.

Structures of the same nature as those obtained by the melt extrusion and subsequent cooling of a plastic material according to the description given, may be also produced by employing viscose, a cuprammonium solution, or similar coagulable liquids extruded through an apparatus similar to that already described directly into a coagulating liquid.

For example, viscose of the composition and salt index commonly employed in the manufacture of rayon, may be pumped into the die and thence continuously extruded directly through small holes into a rayon spinning bath which contains about 10 parts by weight of sulfuric acid and about 18 parts of sodium sulfate with about 72 parts of water. Small amounts of other commonly employed agents such as glucose, two parts, and/or zinc sulfate, one part, may be added to the bath and filaments substantially greater in cross-section that the coarsest commercial rayon yarn may be produced. Substantial amounts of ammonium sulfate may also be added to the coagulating bath.

The net-like structures issuing from the die may be drawn away at speeds substantially exceeding that at which the jets of viscose issue from the die, whereby extension and greater strength of the structure may be achieved.

Any monofilament-forming, extrudable material can be used in this invention. Examples of such materials are:

Cellulosics
Polyethylene
Polypropylene
Nylon
Polyethylene terephthalate
Vinylidene resins and copolymers
Copolymers of ethylene and other olefins
Polyacrylonitrile and its copolymers
Vinyl chloride and its copolymers
Vinyl acetate and its copolymers
Polystyrene
Polyoxyethylene
Polycarbonate
Polyvinyl alcohol The net of this invention readily lends itself to a great variety of uses. It can be used in its cylindrical shape for covering articles such as bottles or the cylinder can be slit so as to produce a flat piece of netting which then can be cut to any desired shape or size.

It is intended that the invention disclosed herein not be limited by the foregoing description but only by the scope of the appended claims.

What is claimed is:

1. A method for producing a thermoplastic net comprising extruding a plurality of individual thermoplastic fibers arranged substantially in a circle and contacting said fibers with at least one additional extruded fiber, said additional fiber being passed around said circle on alternate sides of adjacent parallel fibers.

2. A method for producing a thermoplastic net comprising concurrently extruding a plurality of individual, parallel, thermoplastic fibers arranged substantially in a circle and passing at least one additional extruded fiber around said circle on alternate sides of adjacent parallel fibers while said fibers are in the plastic state, whereby said parallel fibers are bonded to said additional fiber.

3. A method for producing a thermoplastic net comprising concurrently extruding a plurality of individual, parallel, thermoplastic fibers arranged substantially in a circle, contacting said fibers with at least one additional extruded fiber passed around said circle and between said fibers while said fibers are in the plastic state, and passing the net formed thereby over a mandrel disposed at the center of said circle.

4. The method of claim 3, wherein the diameter of said mandrel is at least as large as the diameter of said circle.

5. The method of claim 3, wherein the temperature of said mandrel is maintained at about 50° C. below the temperature of extrusion.

6. A method for producing extruded thermoplastic net which comprises extruding individual parallel thermoplastic fibers from extrusion apertures disposed in a circle, passing at least one additional extruded fiber on alternate sides of adjacent parallel extruded fibers and contacting said parallel fibers with said moving extruded fiber while all fibers are still in the thermoplastic state.

7. An apparatus for producing extruded fiber net which comprises an extrusion plate having extrusion apertures therein disposed in a circle, a second extrusion plate disposed a fixed distance from said first extrusion plate said second extrusion plate having apertures therein disposed in the same circle in which the apertures of said first extrusion plate are arranged, and at least one extrusion nozzle movably mounted within said fixed distance between said first extrusion plate and said second extrusion plate.

8. An apparatus for producing extruded thermoplastic net which comprises an annular extrusion plate having extrusion apertures therein disposed in a circle near the inner edge of said annulus, a circular extrusion plate disposed within said first extrusion plate and having extrusion apertures therein disposed in the circle in which said extrusion apertures of said annular extrusion plate are arranged, and at least one extrusion nozzle movably mounted between said annular extrusion plate and said circular extrusion plate.

9. An apparatus for producing extruded thermoplastic net which comprises an outer annular extrusion plate having an inner edge of varying radius and extrusion apertures therein disposed in a circle near the inner edge of said plate; an inner circular extrusion plate having an outer edge of varying radius, said outer edge corresponding in shape to said inner edge of said outer annular plate, said inner and outer edges being disposed a fixed distance from each other, said inner annular plate having extrusion apertures therein disposed near the outer edge of said plate in the same circle in which said extrusion apertures located in said outer annular plate are disposed; and at least one movable extrusion nozzle rotatably mounted in said fixed space between said extrusion plates having means for moving said movable nozzle in said fixed space.

10. An apparatus for producing extruded thermoplastic net which comprises an outer annular extrusion plate having an inner edge of varying radius, extrusion apertures arranged therein in a circle, said apertures being disposed near the inner edge of said plate at points where said inner edge is closer to the center of said annular extrusion plate; an inner circular extrusion plate having an outer edge of varying radius, said outer edge corresponding in shape to said inner edge of said outer annular plate and disposed a fixed distance therefrom, said inner circular plate having extrusion apertures therein arranged in the same circle in which said extrusion apertures in said outer annular plate are arranged, said extrusion apertures in said inner circular plate being disposed at points near the outer edge of said plate where said outer edge is farthest from the center of said inner circular plate; and at least one movable extrusion nozzle disposed between said inner circular plate and said outer annular plate, said movable nozzle having motive means connected thereto and means for following said inner and outer edges as said nozzle is moved between said extrusion plates.

References Cited in the file of this patent

UNITED STATES PATENTS

| | | |
|---|---|---|
| 2,601,358 | Ancet | June 24, 1952 |
| 2,797,728 | Slayter et al. | July 2, 1957 |

FOREIGN PATENTS

| | | |
|---|---|---|
| 552,251 | Belgium | Nov. 14, 1956 |